US011608767B2

(12) United States Patent
Degner et al.

(10) Patent No.: US 11,608,767 B2
(45) Date of Patent: Mar. 21, 2023

(54) EXHAUST AFTERTREATMENT SENSOR TABLE MOUNTING APPARATUS AND METHOD OF INSTALLING THE SAME

(71) Applicant: CUMMINS EMISSION SOLUTIONS INC., Columbus, IN (US)

(72) Inventors: Brandon Scott Degner, Oregon, WI (US); John Ringstad, Oregon, WI (US); James Klingbeil, Edgerton, WI (US)

(73) Assignee: Cummins Emission Solutions Inc., Columbus, IN (US)

( * ) Notice: Subject to any disclaimer, the term of this patent is extended or adjusted under 35 U.S.C. 154(b) by 0 days.

(21) Appl. No.: 17/424,434

(22) PCT Filed: Jan. 7, 2020

(86) PCT No.: PCT/US2020/012546
§ 371 (c)(1),
(2) Date: Jul. 20, 2021

(87) PCT Pub. No.: WO2020/154094
PCT Pub. Date: Jul. 30, 2020

(65) Prior Publication Data
US 2022/0090532 A1   Mar. 24, 2022

Related U.S. Application Data

(60) Provisional application No. 62/795,282, filed on Jan. 22, 2019.

(51) Int. Cl.
*F01N 13/00*   (2010.01)
*F01N 13/14*   (2010.01)
*F01N 3/28*   (2006.01)

(52) U.S. Cl.
CPC ......... *F01N 13/008* (2013.01); *F01N 13/148* (2013.01); *F01N 3/2864* (2013.01);
(Continued)

(58) Field of Classification Search
CPC combination set(s) only.
See application file for complete search history.

(56) References Cited

U.S. PATENT DOCUMENTS 5,832,723 A * 11/1998 Iwata ...................... F01N 13/08
60/276
5,918,275 A * 6/1999 Kato ................... G01M 15/104
73/114.73

(Continued)

FOREIGN PATENT DOCUMENTS

| CN | 101952133 A | 1/2011 |
| CN | 102758670 A | 10/2012 |

(Continued)

OTHER PUBLICATIONS

Examination Report for U.K. Patent App. No. 1617783.4 dated Nov. 11, 2019, 4 pages.

(Continued)

*Primary Examiner* — Binh Q Tran
(74) *Attorney, Agent, or Firm* — Foley & Lardner LLP

(57) ABSTRACT

A sensor table mounting system includes an insulating blanket assembly and a senor table. The insulating blanket assembly is configured to surround an external housing surface of an exhaust aftertreatment component housing. The insulating blanket assembly includes an inner blanket surface, an outer blanket surface, and a first restraint. The outer blanket surface is opposite the inner blanket surface. The first restraint includes a first restraint first end that is fixed to the outer blanket surface. The sensor table includes a platform, a first standoff, a second standoff, a first footing, (Continued)

and a second footing. The first footing is offset from the platform by the first standoff and configured to be coupled to the first restraint. The second footing is offset from the platform by the second standoff and configured to be coupled to the first restraint.

25 Claims, 3 Drawing Sheets

(52) U.S. Cl.
CPC ........ *F01N 3/2871* (2013.01); *F01N 2260/08* (2013.01); *F01N 2450/18* (2013.01); *F01N 2510/02* (2013.01)

(56) References Cited

U.S. PATENT DOCUMENTS

| | | | |
|---|---|---|---|
| 6,032,538 | A | 3/2000 | Rickman et al. |
| 7,192,463 | B2 | 3/2007 | Shutty et al. |
| 7,897,117 | B2* | 3/2011 | Balk ................ F01N 13/141 |
| | | | 422/171 |
| 7,966,979 | B2 | 6/2011 | Olsen et al. |
| 8,341,949 | B2 | 1/2013 | Tarabulski |
| 9,217,355 | B2 | 12/2015 | Boahene et al. |
| 9,382,832 | B2 | 7/2016 | Bowers |
| 10,371,038 | B2* | 8/2019 | Liu ................ F01N 13/1805 |
| 2005/0005773 | A1* | 1/2005 | Shutty ................ F01N 13/008 |
| | | | 96/417 |
| 2006/0024215 | A1* | 2/2006 | Kroner ................ F01N 3/2857 |
| | | | 422/177 |
| 2007/0163765 | A1 | 7/2007 | Rondier et al. |
| 2008/0121451 | A1 | 5/2008 | Kertz et al. |
| 2010/0031644 | A1 | 2/2010 | Keane et al. |
| 2011/0005853 | A1 | 1/2011 | Kamiya |
| 2011/0023452 | A1* | 2/2011 | Gisslen ............... F01N 13/1844 |
| | | | 60/272 |
| 2011/0099978 | A1 | 5/2011 | Davidson et al. |
| 2012/0273648 | A1 | 11/2012 | Maske et al. |
| 2013/0145820 | A1 | 6/2013 | Boahene et al. |
| 2013/0164182 | A1 | 6/2013 | Iijima et al. |
| 2013/0330237 | A1 | 12/2013 | Lamps et al. |
| 2014/0104048 | A1 | 4/2014 | De Kock et al. |
| 2014/0373721 | A1 | 12/2014 | Sandou et al. |
| 2015/0000389 | A1* | 1/2015 | Runde ................ F01N 3/021 |
| | | | 73/114.75 |
| 2015/0059457 | A1 | 3/2015 | Niaz |
| 2016/0369940 | A1 | 12/2016 | Patil et al. |
| 2017/0184004 | A1* | 6/2017 | Butler ................ F01N 13/008 |
| 2019/0101041 | A1* | 4/2019 | Willats ................ F01N 13/148 |

FOREIGN PATENT DOCUMENTS

| | | |
|---|---|---|
| CN | 106232405 A | 12/2016 |
| DE | 10 2007 054 066 A1 | 5/2008 |
| DE | 10 2010 060 071 A1 | 5/2012 |
| EP | 2 568 139 A1 | 3/2013 |
| WO | WO-2012/096513 A2 | 7/2012 |

OTHER PUBLICATIONS

Extended European Search Report for European Patent App. No. 14174823.6 dated Oct. 28, 2014, 8 pages.
Extended European Search Report for European Patent App. No. 16189819.2 dated Mar. 6, 2017, 8 pages.
First Examination Report for Indian Patent App. No. 201647036133 dated Jul. 26, 2019, 7 pages.
First Office Action for Chinese Patent App. No. 2015800217463 dated Mar. 30, 2018, 19 pages.
International Search Report & Written Opinion for PCT/US2015/027508 dated Jul. 28, 2015, 8 pages.
International Search Report & Written Opinion for PCT/US2020/012546 dated Apr. 2, 2020, 12 pages.
Notice of Allowance for U.S. Appl. No. 15/305,061 dated Aug. 8, 2018, 5 pages.
Office Action for European Patent App. No. 16189819.2 dated Dec. 22, 2017, 8 pages.
Office Action for U.S. Appl. No. 14/317,680 dated Jun. 28, 2016, 10 pages.
Office Action for U.S. Appl. No. 15/305,061 dated Jan. 16, 2018, 17 pages.
Office Action for U.S. Appl. No. 16/216,747 dated Mar. 30, 2020, 11 pages.
First Office Action issued in Chinese Patent Application No. CN 202080010094.4 dated Oct. 9, 2022.

\* cited by examiner

EXHAUST AFTERTREATMENT SENSOR TABLE MOUNTING APPARATUS AND METHOD OF INSTALLING THE SAME

CROSS REFERENCE TO RELATED APPLICATIONS

This application is a national stage of PCT Application No. PCT/US2020/012546, filed Jan. 7, 2020, which claims the benefit of U.S. Provisional Patent Application No. 62/795,282, filed Jan. 22, 2019. The contents of these applications are incorporated herein by reference in their entireties.

TECHNICAL FIELD

The present disclosure relates generally to exhaust aftertreatment systems.

BACKGROUND

Exhaust aftertreatment systems receive and treat exhaust gas generated from an internal combustion ("IC") engine. Typical exhaust aftertreatment systems include any of various components configured to reduce the level of harmful exhaust emissions present in the exhaust gas. For example, some exhaust aftertreatment systems for IC engines, such as diesel-powered IC engines, include various components, such as a diesel oxidation catalyst ("DOC"), particulate matter filter or diesel particulate filter ("DPF"), and a selective catalytic reduction ("SCR") catalyst, among others. Each of the DOC, DPF, and SCR catalyst components is configured to perform a particular exhaust emissions treatment operation on the exhaust gas passing through the components. Generally, the DOC reduces the amount of carbon monoxide and hydrocarbons present in the exhaust gas via oxidation techniques. The DPF filters harmful diesel particulate matter and soot present in the exhaust gas. Finally, the SCR catalyst reduces the amount of nitrogen oxide ($NO_x$) present in the exhaust gas.

Exhaust aftertreatment components may be controlled based on detected operating conditions to facilitate optimal exhaust emissions treatment. Typically, the operating conditions include exhaust gas conditions that are detected by one or more sensors in fluid communication with the exhaust gas passing through the exhaust aftertreatment system. The sensors may be electrically coupled to one or more modules that process and transmit data associated with the signals received from the sensors. For example, a conventional exhaust aftertreatment system may include exhaust temperature sensors to detect the temperature of exhaust gas at various locations within the system, exhaust pressure sensors to detect the pressure of exhaust gas at various locations within the system, $NO_x$ sensors to detect the concentration of $NO_x$ in the exhaust gas at various locations within the system, and ammonia ($NH_3$) sensors to detect the concentration of ammonia in the exhaust gas at various locations within the system.

Exhaust aftertreatment sensors and associated modules can be mounted onto an exterior surface of an exhaust aftertreatment component housing or onto a device (e.g., a frame member) remote from the housing. Conventional aftertreatment sensors and modules are susceptible to degradation and failure due to exposure to excessive heat and vibration. Heat from the exhaust gas flowing through the exhaust aftertreatment components tends to transfer from the exhaust gas, through the housing, and into the sensors and modules via conduction and convection. Further, the sensors and modules may vibrate during operation of the engine due to vibration induced by the engine and/or by a vehicle in which the engine is housed. Although some heat transfer and/or vibration may be tolerable, excessive heat transfer and/or vibration may result in fault codes, component failures, vehicle down time, and higher costs.

SUMMARY

One embodiment is related to a sensor table mounting system. The sensor table mounting system includes an insulating blanket assembly and a senor table. The insulating blanket assembly is configured to surround an external housing surface of an exhaust aftertreatment component housing. The insulating blanket assembly includes an inner blanket surface, an outer blanket surface, and a first restraint. The outer blanket surface is opposite the inner blanket surface. The first restraint includes a first restraint first end that is fixed to the outer blanket surface. The sensor table includes a platform, a first standoff, a second standoff, a first footing, and a second footing. The first footing is offset from the platform by the first standoff and configured to be coupled to the first restraint. The second footing is offset from the platform by the second standoff and configured to be coupled to the first restraint. The sensor table is configured to be removably coupled to the insulating blanket assembly via the first restraint being coupled to at least one of the first footing or the second footing.

Another embodiment is related to an insulating blanket assembly. The insulating blanket assembly is configured to surround an external housing surface of an exhaust aftertreatment component housing. The insulating blanket assembly includes an inner blanket surface, an outer blanket surface, and a first restraint. The outer blanket surface is opposite the inner blanket surface. The first restraint includes a first restraint first end that is fixed to the outer blanket surface. The insulating blanket assembly is configured to be removably coupled to a sensor table via the first restraint.

Various other embodiments relate to an insulating blanket assembly configured to surround an external housing surface of an exhaust aftertreatment component housing. An example insulating blanket assembly includes an inner blanket surface and an outer blanket surface opposite the inner blanket surface. The insulating blanket assembly also includes a first restraint that has a first end. The first end is fixed to the outer blanket surface. The insulating blanket assembly is configured to be removably coupled to a sensor table via the first restraint.

These and other features, together with the organization and manner of operation thereof, will become apparent from the following detailed description when taken in conjunction with the accompanying drawings, wherein like elements have like numerals throughout the several drawings described below.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims.

Figure 1:
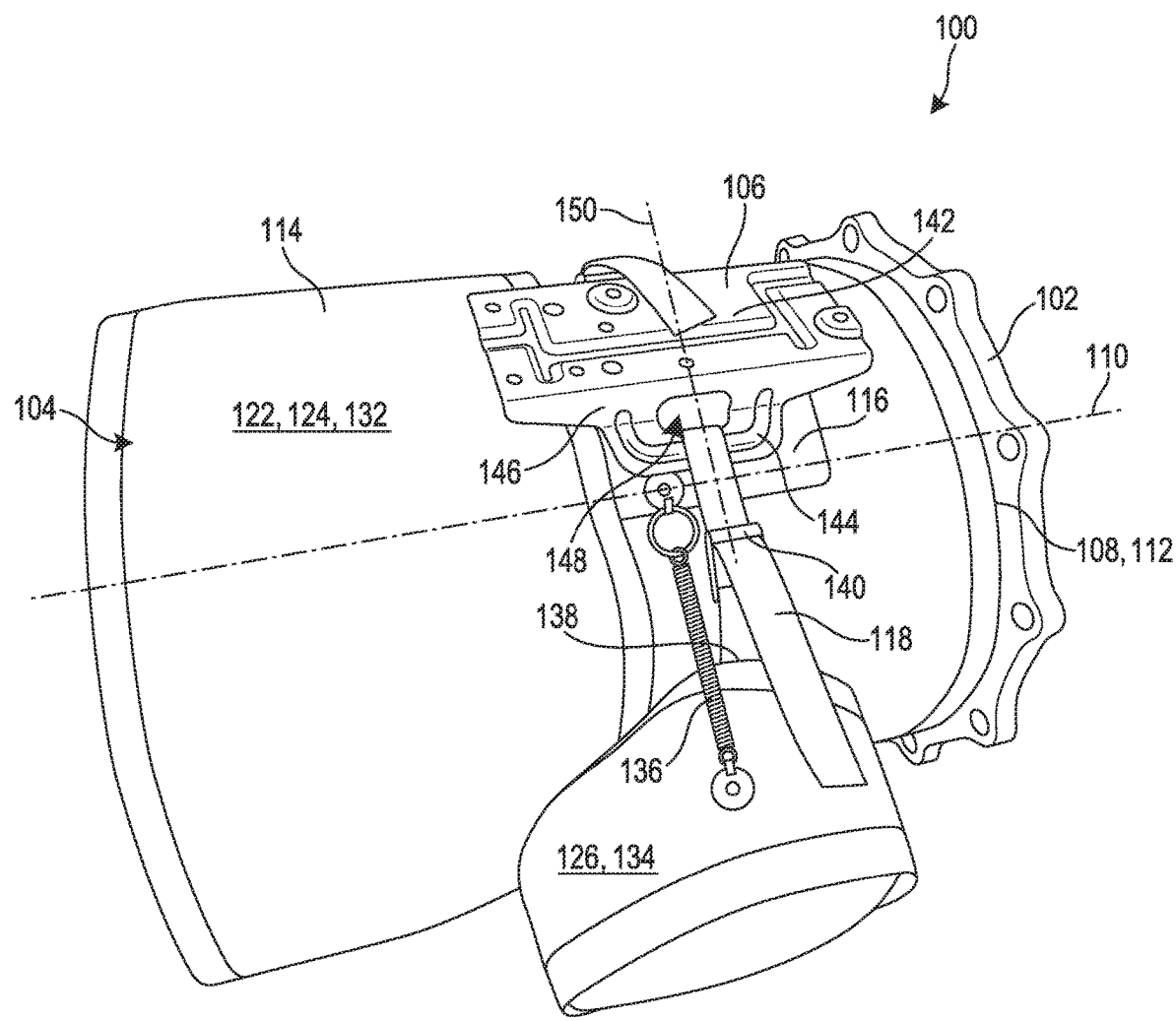
FIG. 1 is a perspective view of an exhaust aftertreatment sensor table mounting system, according to an example embodiment.

It will be recognized that some or all of the figures are schematic representations for purposes of illustration. The figures are provided for the purpose of illustrating one or more implementations with the explicit understanding that they will not be used to limit the scope or the meaning of the claims.

DETAILED DESCRIPTION

Various embodiments relate to a sensor table mounting system for mounting a sensor table to an exhaust aftertreatment component via an insulating blanket assembly coupled to the exhaust aftertreatment component. The insulating blanket assembly includes an inner blanket surface and an outer blanket surface opposite the inner blanket surface. A first restraint includes a first end fixed to the outer blanket surface. The sensor table includes a platform and first and second footings. Each of the first and second footings is offset from the platform by respective first and second standoffs. The sensor table is removably coupled to the insulating blanket assembly via the first restraint coupled to at least one of the first and second footings.

The sensor table mounting system provides various technical advantages over existing systems. One problem with existing aftertreatment systems is that sensor modules mounted directly to or near to an exhaust aftertreatment component may overheat due to heat transfer from the exhaust aftertreatment component to the sensor module. In certain existing systems, sensor tables are mounted remote from the exhaust aftertreatment component in order to minimize heat transferred from the exhaust aftertreatment component to the sensor module. This configuration may solve issues relating to sensor module overheating; however, it is not preferable because it requires long runs of cables routed from the sensors to the sensor module. In other existing systems, the sensor table is mounted to the exhaust aftertreatment component housing. This configuration, however, can sometimes lead to sensor module overheating.

Certain aftertreatment systems utilize insulation to minimize heat transfer from an exhaust aftertreatment component. However, the use of insulation may preclude such systems from mounting the sensor table to the exhaust aftertreatment component because the sensor table may damage the insulation during use. For example, sensor tables are typically made of sheet metal, which can dig into the insulation during use and cause permanent damage to the insulation over time. Some such systems attach the sensor table via a fastener that extends through the insulation and into the exhaust aftertreatment component housing. One disadvantage to such systems is that the fastener provides a heat transfer path to the sensor table and creates a hole in the insulation, thereby degrading its performance.

Certain embodiments of the sensor table mounting systems described in the present application can enable the sensor table to be mounted to an exhaust aftertreatment component housing via an insulating blanket assembly, while reducing or preventing overheating of a sensor module mounted to the sensor table. In some embodiments, the insulating blanket assembly includes a mounting panel to which the sensor table is configured to be mounted. The mounting panel enables the sensor table to be mounted to the insulating blanket assembly while inhibiting or preventing the sensor table from damaging the insulation during use. In some embodiments, the insulating blanket assembly also includes a heat shield to further minimize heat transfer to the sensor table.

Another problem with existing systems is that electronic components, such as sensor modules, are susceptible to component failure due to excessive vibration. For example, in certain existing systems, the sensor table is fixed (e.g., screwed or welded) directly to the exhaust aftertreatment component housing, which enables high frequency vibration to be transmitted to the sensor table.

Certain embodiments of the sensor table mounting system described in the present application can minimize high frequency vibration transferred to the sensor table from the exhaust aftertreatment component by use of the insulating blanket and flexible restraints coupled thereto. For example, in certain embodiments, the sensor table mounting system is configured such that the sensor table is attached to the insulating blanket assembly via restraints (e.g., straps) coupled to the insulating blanket. In some embodiments, the restraints are made of flexible material, such as fabric. In some embodiments, the restraints include a band clamp and/or a spring. In such embodiments, the insulation and the flexible restraints damp high frequency vibration to minimize transmission to the sensor table.

Another problem with existing systems is that they are difficult to service. As mentioned above, in some existing systems, the sensor table is welded or otherwise fixed to the exhaust aftertreatment component housing. As such, it may be difficult to remove the sensor table to repair or replace a component. In contrast, in certain embodiments of the present application, the restraints are easily removable so as to allow removal of the sensor table from the exhaust aftertreatment component housing.

FIG. 1 is a perspective view of an exhaust aftertreatment sensor table mounting system 100, according to an example embodiment. The exhaust aftertreatment sensor table mounting system 100 includes, an insulating blanket assembly 104 and a sensor table 106.

An exhaust aftertreatment component 102 includes an exhaust aftertreatment component housing 108 that defines a central axis 110. In operation, hot exhaust gas flows through the exhaust aftertreatment component 102 generally along the central axis 110. The exhaust aftertreatment component housing 108 also defines an external housing surface 112. In FIG. 1, the external housing surface 112 is beneath the insulating blanket assembly 104.

The exhaust aftertreatment component 102 may be any of various types of exhaust aftertreatment devices. In one embodiment, the exhaust aftertreatment component 102 is an SCR catalyst. In other embodiments, the exhaust aftertreatment component 102 is any of a DOC, DPF, or another type of exhaust aftertreatment component.

The insulating blanket assembly 104 is structured to minimize heat transfer from the exhaust aftertreatment component 102 to the sensor table 106. In other words, the insulating blanket assembly 104 is structured to keep the hot exhaust gas flowing through the exhaust aftertreatment component 102 hot and to keep the sensor module(s) mounted to the sensor table 106 cool. The insulating blanket assembly 104 includes an insulating blanket 114, a mounting panel 116, and a first restraint 118. The insulating blanket 114 includes an outer blanket surface 122 and an inner blanket surface opposite the outer blanket surface 122. As illustrated in FIG. 1, the inner blanket surface is positioned against the external housing surface 112.

According to some embodiments, the insulating blanket 114 is formed of multiple layers. For example, in some embodiments, the insulating blanket 114 includes an inward-facing layer, an outward-facing layer opposite the inward-facing layer, and an insulation layer sandwiched between the inward-facing layer and the outward-facing layer. The inward-facing layer defines the inner blanket surface, and the outward-facing layer defines the outer blanket surface 122. According to various embodiments, the inward-facing layer is formed of one or more of a knitted metal (e.g., stainless steel) wire mesh, a metal (e.g., 321 alloy or nickel chromium alloy) foil, an amorphous silica fabric, a polytetrafluoroethylene-coated fiberglass fabric, a metallic flashing, insulation, or a flexible insulation containment layer. The outward-facing layer is formed of one or more of a silicone-coated fiberglass fabric, a polytetrafluoroethylene-coated fiberglass fabric, a flexible insulation containment layer, or a mounting plate or layer. The insulation layer is formed of one or more of an alkaline earth silicate, a fiberglass yarn needle, or a vitreous silicate fiber mat. It is understood that the insulating blanket 114 may be formed from more than two layers (e.g., three layers, four layers, etc.).

In some embodiments, the insulating blanket 114 includes multiple insulating blanket sections. For example, in the embodiment illustrated in FIG. 1, the insulating blanket 114 includes a first insulating blanket section 124 and a second insulating blanket section 126. The inner blanket surface of the insulating blanket 114 includes a first inner blanket surface of the first insulating blanket section 124 and a second inner blanket surface of the second insulating blanket section 126. The outer blanket surface 122 of the insulating blanket 114 includes a first outer blanket surface 132 of the first insulating blanket section 124 and a second outer blanket surface 134 of the second insulating blanket section 126. The first insulating blanket section 124 and the second insulating blanket section 126 may be fixedly or removably attached to each other. For example, in the embodiment illustrated in FIG. 1, the first insulating blanket section 124 and the second insulating blanket section 126 are removably attached to each other via a spring coupler 136. In other embodiments, the first insulating blanket section 124 and the second insulating blanket section 126 are removably attached to each other via snaps, zippers, clips, or other types of fasteners.

The mounting panel 116 is fixed to the outer blanket surface 122 (e.g., to the first outer blanket surface 132 of the first insulating blanket section 124). For example, in some embodiments, the mounting panel 116 is sewn to the outer blanket surface 122 using a metal (e.g., stainless steel) wire. In some embodiments, the mounting panel 116 is formed of a metal mesh or a fine-gauge sheet metal, such as 20-22 gauge stainless steel. In some embodiments, the mounting panel 116 is structured to further minimize heat transfer between the exhaust aftertreatment component 102 and the sensor table 106 in the localized area proximate the sensor table 106. Some embodiments do not include the mounting panel 116. In such embodiments, the sensor table 106 is removably coupled to the outer blanket surface 122. Some embodiments include a heat shield in addition to or instead of the mounting panel 116 to minimize heat transfer from the exhaust aftertreatment component 102 to the sensor table 106.

The first restraint 118 is structured to removably couple the sensor table 106 to the exhaust aftertreatment component 102. The first restraint 118 has a first restraint first end 138 that is fixed (e.g., sewn) to the outer blanket surface 122 of the insulating blanket 114. In the embodiment illustrated in FIG. 1, the first restraint first end 138 of the first restraint 118 is fixed to the second outer blanket surface 134 of the second insulating blanket section 126. In other embodiments, the first restraint first end 138 of the first restraint 118 is fixed to the first outer blanket surface 132 of the first insulating blanket section 124. Although only one restraint (the first restraint 118) is shown in FIG. 1, the insulating blanket assembly 104 has a second restraint on the opposite side of the sensor table 106 than the first restraint 118. In other embodiments, the insulating blanket assembly 104 has additional or fewer restraints. For example, in one embodiment, the insulating blanket assembly 104 has only one restraint to couple the sensor table 106 to the exhaust aftertreatment component 102. In another embodiment, the insulating blanket assembly 104 has four restraints to couple the sensor table 106 to the exhaust aftertreatment component 102. In other examples, the insulating blanket assembly 104 may have six, eight, ten, or twelve restraints, each similar to the first restraint 118 and the second restraint described herein.

According to various embodiments, the first restraint 118 is formed of a flexible material. For example, in one embodiment, the first restraint 118 is a fabric strap that includes a buckle 140 to facilitate tightening the first restraint 118 to the insulating blanket 114. In other embodiments, the first restraint 118 is a different type of restraint. In other embodiments, the first restraint 118 includes a spring. The use of flexible restraints minimizes transmission of high frequency vibration from the exhaust aftertreatment component housing to the sensor table 106. In some embodiments, the spring rate of the first restraint 118 and/or the tension of the first restraint 118 when engaged to the sensor table 106 is tuned so as to further minimize vibrations at certain frequencies.

The sensor table 106 includes a platform 142, footings 144, and standoffs 146 (e.g., a first standoff 146 and a second standoff 146, etc.). The platform 142 is structured to support one or more sensor modules or controllers. The footings 144 are offset from the platform 142 by the standoffs 146. In other words, the standoffs 146 form an air gap between the insulating blanket assembly 104 and the platform 142. The air gap is structured to further minimize heat transfer between the exhaust aftertreatment component 102 and the sensor table 106. Although only one of each of the footings 144 and standoffs 146 is visible in FIG. 1, it should be appreciated that the sensor table 106 has two footings 144 (first and second footings) and two standoffs 146 (first and second standoffs). In some embodiments, the sensor table 106 includes more than two footings 144 (e.g., four footings 144, six footings 144, eight footings 144, etc.).

The footings 144 each define a mounting aperture 148 structured to receive the first restraint 118. In the embodiment illustrated in FIG. 1, the first restraint 118 extends through the mounting aperture 148 and through the buckle 140. The first restraint 118 is tightened to a desired tension and retained via the buckle 140. In other embodiments, the first restraint 118 is coupled to the mounting aperture 148. Other embodiments include a connector or other type of engagement feature to couple the first restraint 118 and the sensor table 106. For example, a hook and clasp or a T-bolt and trunnion may be used to couple the first restraint 118 and the sensor table 106.

In some embodiments, the first restraint 118 and the second restraint are replaced by a band clamp. In such embodiments, the band clamp is positioned around the insulating blanket 114 and feed through the mounting apertures 148 such that tightening of the band clamp radially compresses the insulating blanket 114 and causes the sensor table 106 to be held onto the exhaust aftertreatment component 102.

In other embodiments, the first restraint 118 and/or the second restraint are hook and loop fastening members such as Velcro®. In some applications, the first restraint 118 and/or the second restraint may incorporate zippers, buttons, clasps, and other reclosable fasteners.

In various embodiments, the first restraint 118 and/or the second restraint are constructed from metallic fabric or fibrous fabric that has a relatively high tensile force and is suited for prolonged use at relatively high temperatures. In some embodiments, the first restraint 118 and/or the second restraint may be thin straps made from stainless steel (e.g., 400 series steel, etc.).

The first restraint 118 extends from the first restraint first end 138 to the mounting aperture 148 along a first direction 150. In the embodiment illustrated in FIG. 1, the first direction 150 is perpendicular to the central axis 110. However, as will be appreciated, in other embodiments, first restraint 118 extends from the first restraint first end 138 to the mounting aperture 148 along a direction that is not perpendicular to the central axis 110.

Figure 2:
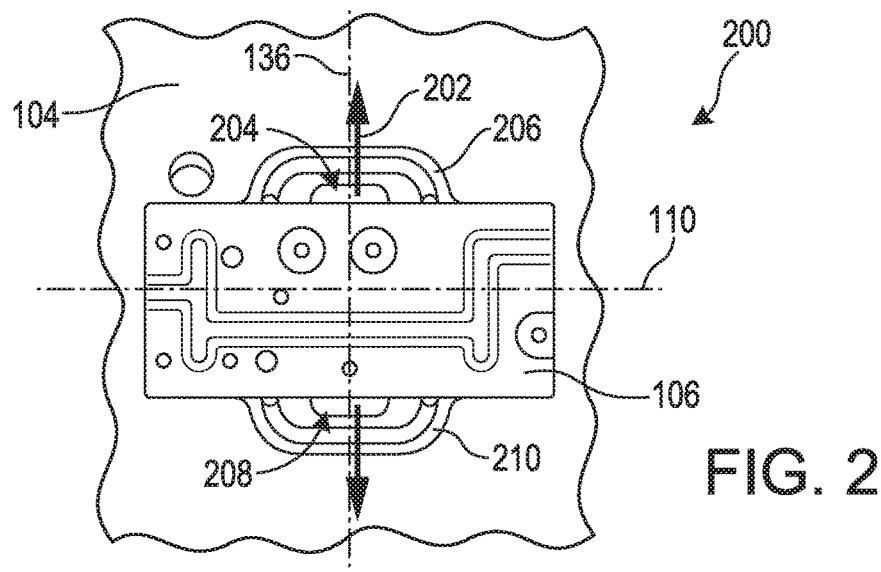
FIG. 2 is a top view of an exhaust aftertreatment sensor table mounting system including a single restraint, according to an example embodiment.
Figure 3:
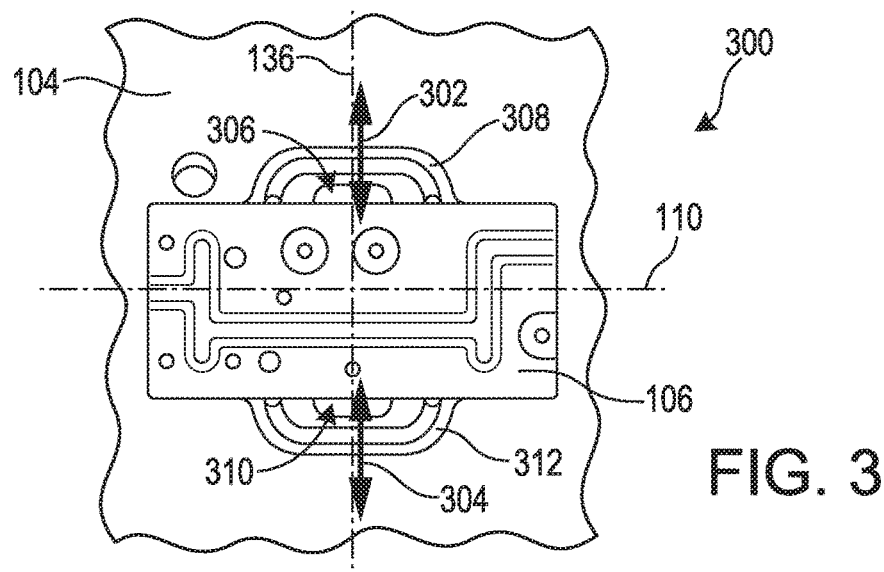
FIG. 3 is a top view of an exhaust aftertreatment sensor table mounting system including two restraints, according to an example embodiment.
Figure 4:
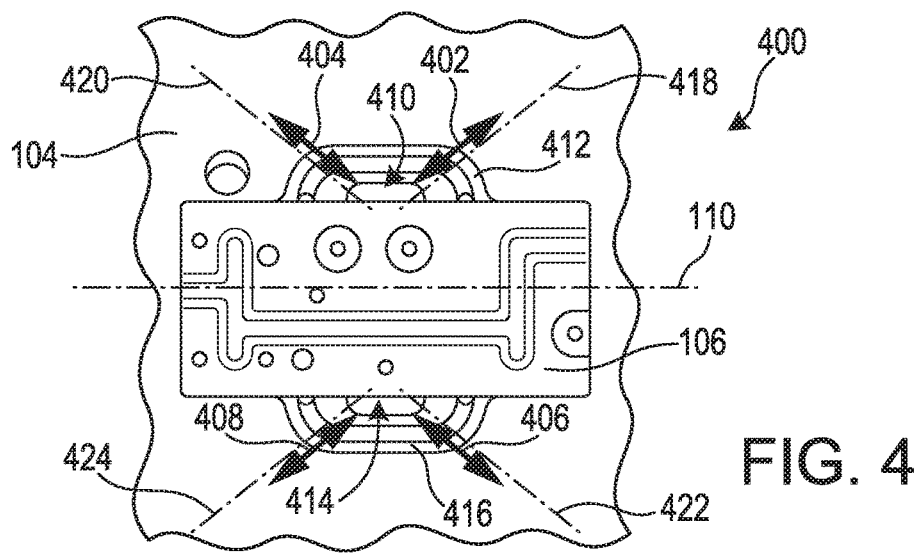
FIG. 4 is a top view of an exhaust aftertreatment sensor table mounting system including four restraints, according to an example embodiment.

FIGS. 2-4 illustrate various mounting configurations of the sensor table 106 to the exhaust aftertreatment component 102 via the insulating blanket assembly 104, according to various embodiments. In FIGS. 2-4, the restraints are shown as arrows for the sake of clarity.

FIG. 2 is a side perspective view of an exhaust aftertreatment sensor table mounting system 200 including a single restraint: a first restraint 202, according to an example embodiment. The first restraint 202 extends through a first mounting aperture 204 of a first footing 206 and through a second mounting aperture 208 of a second footing 210. The first restraint 202 extends along the first direction 150 that is perpendicular to the central axis 110. In one embodiment, the first restraint 202 is a band strap.

FIG. 3 is a side perspective view of an exhaust aftertreatment sensor table mounting system 300 including two restraints: a first restraint 302 and a second restraint 304, according to an example embodiment. The first restraint 302 extends through a first mounting aperture 306 of a first footing 308. The second restraint 304 extends through a second mounting aperture 310 of a second footing 312. The first restraint 302 and the second restraints 304 extend along the first direction 150 that is perpendicular to the central axis 110. In one embodiment, the first restraint 302 and the second restraints 304 are fabric straps.

FIG. 4 is a side perspective view of an exhaust aftertreatment sensor table mounting system 400 including four restraints: a first restraint 402, a second restraint 404, a third restraint 406, and a fourth restraint 408, according to an example embodiment. The first restraint 402 extends through a first mounting aperture 410 of a first footing 412. The second restraint 404 also extends through the first mounting aperture 410 of the first footing 412. The third restraint 406 extends through a second mounting aperture 414 of a second footing 416. The fourth restraint 408 also extends through the second mounting aperture 414 of the second footing 416. The first restraint 402 extends along a first direction 418, the second restraint 404 extends along a second direction 420, the third restraint 406 extends along a third direction 422, and the fourth restraint 408 extends along a fourth direction 424. Each of the first direction 418, the second direction 420, the third direction 422, and the fourth directions 424 are oriented at an oblique (non-perpendicular) angle relative to the central axis 110.

Figure 5:
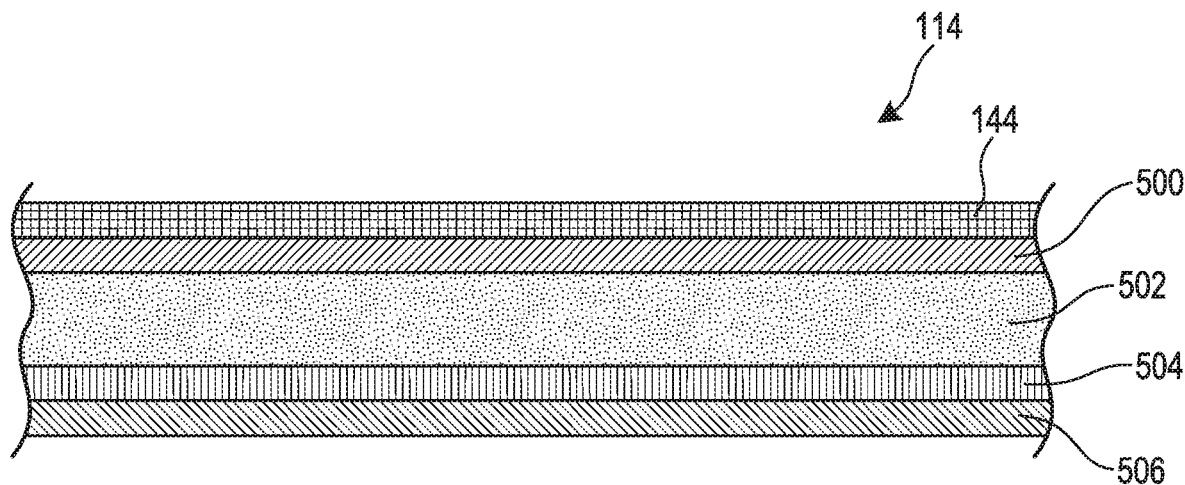
FIG. 5 is a cross-sectional view of a footing of the exhaust aftertreatment sensor table mounting system shown in FIG. 1 mounted to an insulating blanket, according to an example embodiment.

FIG. 5 illustrates a cross-sectional view of a footing 144 of the exhaust aftertreatment sensor table mounting system 100 mounted to the insulating blanket 114 according to various embodiments. The insulating blanket 114 includes a first layer 500. The first layer 500 is exposed to atmosphere (e.g., outward-facing) and is configured to interface with the footing 144. In various embodiments, the first layer 500 is formed of one or more of a silicone-coated fiberglass fabric, a polytetrafluoroethylene-coated fiberglass fabric, a flexible insulation containment layer, or a mounting plate or layer. The insulating blanket 114 also includes a second layer 502. The second layer 502 is covered by the first layer 500 and separated from the footing 144 by the first layer 500. In various embodiments, the second layer 502 is an insulating layer. For example, the second layer 502 may be formed of one or more of an alkaline earth silicate, a fiberglass yarn needle, or a vitreous silicate fiber mat. The insulating blanket 114 also includes a third layer 504. The third layer 504 is covered by the second layer 502 and separated from the footing 144 by the second layer 502 and the first layer 500. The third layer 504 is exposed to the exhaust aftertreatment component 102 (e.g., inward-facing) and is configured to interface with the exhaust aftertreatment component 102. In various embodiments, the third layer 504 is formed of one or more of a knitted metal (e.g., stainless steel) wire mesh, a metal (e.g., 321 alloy or nickel chromium alloy) foil, an amorphous silica fabric, a polytetrafluoroethylene-coated fiberglass fabric, a metallic flashing, insulation, or a flexible insulation containment layer. The exhaust aftertreatment component 102 includes an outer wall 506. The third layer 504 interfaces with the outer wall 506 and the outer wall 506 transfers heat to the third layer 504. The third layer 504 transfers heat to the second layer 502. The second layer 502 transfers heat to the first layer 500. The first layer 500 transfers heat to the footing 144. In various embodiments, gaps (e.g., air gaps, etc.) and fillings may be incorporated between the footing 144 and the first layer 500, the first layer 500 and the second layer 502, the second layer 502 and the third layer 504, and/or the third layer 504 and the outer wall 506.

Figure 6:
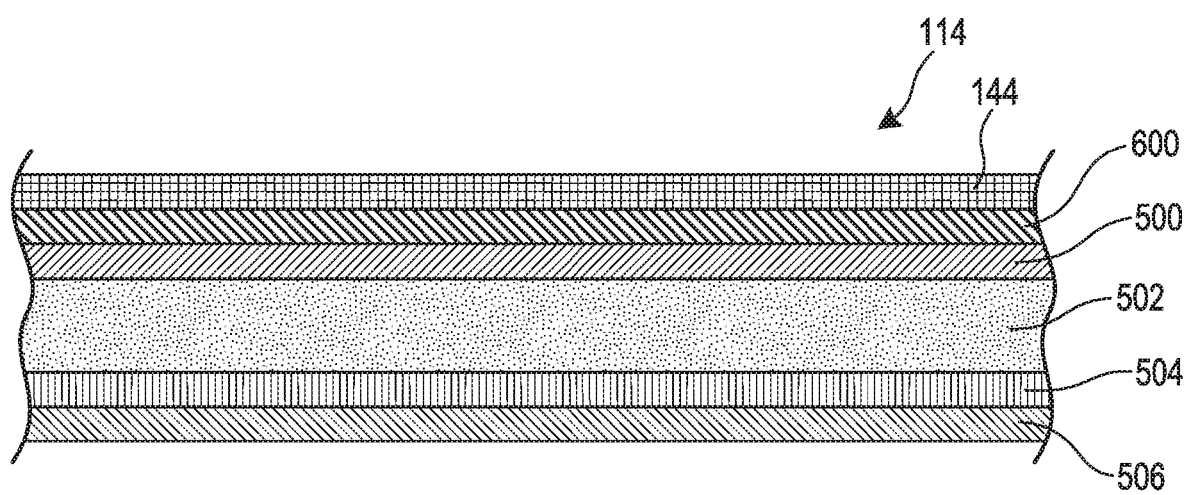
FIG. 6 is a cross-sectional view of a footing of the exhaust aftertreatment sensor table mounting system shown in FIG. 1 mounted to an insulating blanket, according to another example embodiment.

FIG. 6 illustrates a cross-sectional view of a footing 144 of the exhaust aftertreatment sensor table mounting system 100 mounted to the insulating blanket 114 according to various embodiments. In these embodiments, the insulating blanket 114 includes the first layer 500, the second layer 502, and the third layer 504, as previously described. Additionally, the insulating blanket 114 includes a fourth layer 600. The fourth layer 600 separates the footing 144 from the first layer 500. Accordingly, the fourth layer 600 is configured to cover at least a portion of the first layer 500. In various embodiments, the fourth layer 600 is a knitted metal (e.g., stainless steel) wire mesh, a metal (e.g., 321 alloy or nickel chromium alloy) foil, or a metallic flashing. The fourth layer 600 functions to mitigate the effects of contact between the footing 144, which is rigid, and the first layer 500, which may not be rigid. The fourth layer 600 is particularly beneficial when the first layer 500 is non-metallic. The fourth layer 600 may only extend across a portion of the first layer 500. For example, the fourth layer 600 may be sewn into the first layer 500 over a location on the first layer 500 where the footing 144 is configured to be disposed, so as to separate the footing 144 from the first layer 500.

The first layer 500 transfers heat to the fourth layer 600 which transfers heat to the footing 144. In various embodiments, gaps (e.g., air gaps, etc.) and fillings may be incorporated between the footing 144 and the fourth layer 600 and between the first layer 500 and the fourth layer 600.

It should be understood that no claim element herein is to be construed under the provisions of 35 U.S.C. § 112(f), unless the element is expressly recited using the phrase "means for." Reference throughout this specification to "one embodiment," "an embodiment," "an example embodiment," or similar language means that a particular feature, structure, or characteristic described in connection with the embodiment is included in at least one embodiment of the present invention. Thus, appearances of the phrases "in one embodiment," "in an embodiment," "in an example embodiment," and similar language throughout this specification may, but do not necessarily, all refer to the same embodiment.

Accordingly, the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. A sensor table mounting system comprising:
   an insulating blanket assembly configured to surround an external housing surface of an exhaust aftertreatment component housing, the insulating blanket assembly comprising:
   an inner blanket surface,
   an outer blanket surface opposite the inner blanket surface,
   a first restraint comprising a first restraint first end that is fixed to the outer blanket surface, and
   a mounting panel fixed relative to the outer blanket surface; and
   a sensor table comprising:
   a platform,
   a first standoff,
   a second standoff,
   a first footing offset from the platform by the first standoff and configured to be coupled to the first restraint, and
   a second footing offset from the platform by the second standoff and configured to be coupled to the first restraint,
   wherein the sensor table is configured to be removably coupled to the insulating blanket assembly via the first restraint being coupled to at least one of the first footing or the second footing; and
   wherein the first footing and the second footing each abut the mounting panel when the sensor table is coupled to the insulating blanket assembly.

2. The sensor table mounting system of claim 1, wherein: the insulating blanket assembly comprises a first insulating blanket section and a second insulating blanket section,
   the inner blanket surface comprises a first inner blanket surface of the first insulating blanket section and a second inner blanket surface of the second insulating blanket section,
   the outer blanket surface comprises a first outer blanket surface of the first insulating blanket section and a second outer blanket surface of the second insulating blanket section, and
   the first restraint first end is fixed to the second outer blanket surface.

3. The sensor table mounting system of claim 1, wherein:
   a first mounting aperture is defined by at least one of the first footing or the first standoff,
   a second mounting aperture is defined by at least one of the second footing or the second standoff, and
   the first restraint is configured to be coupled to the at least one of the first footing or the second footing, via the first mounting aperture or the second mounting aperture.

4. The sensor table mounting system of claim 3, wherein the first restraint extends through each of the first mounting aperture and the second mounting aperture so as to removably couple the sensor table to the insulating blanket assembly.

5. The sensor table mounting system of claim 4, wherein the first restraint is configured to extend from the first restraint first end and through the first mounting aperture and the second mounting aperture along a direction that is perpendicular to a central axis of the exhaust aftertreatment component housing.

6. The sensor table mounting system of claim 3, wherein:
   the insulating blanket assembly further comprises a second restraint, the second restraint comprising a second restraint first end fixed to the outer blanket surface, and
   the sensor table is configured to be removably coupled to the insulating blanket assembly via the first restraint extending through the first mounting aperture and further via the second restraint extending through the second mounting aperture.

7. The sensor table mounting system of claim 6, wherein:
   the first restraint is configured to extend from the first restraint first end and through the first mounting aperture along a first direction perpendicular to a central axis of the exhaust aftertreatment component housing, and
   the second restraint is configured to extend from the second restraint first end and through the second mounting aperture along the first direction.

8. The sensor table mounting system of claim 7, wherein: the insulating blanket assembly further comprises:
   a third restraint, the third restraint comprising a third restraint first end fixed to the outer blanket surface, and
   a fourth restraint, the fourth restraint comprising a fourth restraint first end fixed to the outer blanket surface, and
   the sensor table is configured to be removably coupled to the insulating blanket assembly via the third restraint extending through the first mounting aperture and further via the fourth restraint extending through the second mounting aperture.

9. The sensor table mounting system of claim 8, wherein: the first restraint extends from the first restraint first end through the first mounting aperture along a second direction oriented at an oblique angle relative to the central axis, the second restraint extends from the second restraint first end through the second mounting aperture along the second direction, the third restraint extends from the third restraint first end through the first mounting aperture along the second direction, and the fourth restraint extends from the fourth restraint first end through the second mounting aperture along the second direction.

10. The sensor table mounting system of claim 3, wherein the first restraint comprises a strap.

11. The sensor table mounting system of claim 3, wherein the first restraint comprises a spring.

12. The sensor table mounting system of claim 3, wherein the first restraint comprises a band clamp.

13. An insulating blanket assembly configured to surround an external housing surface of an exhaust aftertreatment component housing, the insulating blanket assembly comprising:
an inner blanket surface;
an outer blanket surface opposite the inner blanket surface;
a mounting panel fixed to the outer blanket surface; and
a first restraint comprising a first restraint first end that is fixed to the outer blanket surface,
wherein the insulating blanket assembly is configured to be removably coupled to a sensor table via the first restraint; and
wherein the mounting panel is configured to have the sensor table mounted thereon.

14. The insulating blanket assembly of claim 13, wherein:
the insulating blanket assembly comprises a first insulating blanket section and a second insulating blanket section,
the inner blanket surface comprises a first inner blanket surface of the first insulating blanket section and a second inner blanket surface of the second insulating blanket section,
the outer blanket surface comprises a first outer blanket surface of the first insulating blanket section and a second outer blanket surface of the second insulating blanket section, and
the first restraint first end is fixed to the second outer blanket surface.

15. The insulating blanket assembly of claim 13, wherein the insulating blanket assembly is configured to be removably coupled to the sensor table via coupling of the first restraint to at least one of a first footing of the sensor table or a second footing of the sensor table.

16. The insulating blanket assembly of claim 15, wherein:
the first footing defines a first mounting aperture,
the second footing defines a second mounting aperture, and
the first restraint is configured to be coupled to the mounting panel via at least one of the first mounting aperture or the second mounting aperture.

17. The insulating blanket assembly of claim 16, wherein the first restraint is configured to extend through the first mounting aperture and the second mounting aperture, to removably couple the insulating blanket assembly to the sensor table.

18. The insulating blanket assembly of claim 17, wherein the first restraint is configured to extend from the first restraint first end and through the first mounting aperture and the second mounting aperture along a direction perpendicular to a central axis of the exhaust aftertreatment component housing.

19. The insulating blanket assembly of claim 16, further comprising:
a second restraint comprising a second restraint first end that is fixed to the outer blanket surface, and
wherein the insulating blanket assembly is configured to be removably coupled to the sensor table via the first restraint and the second restraint, the first restraint configured to extend through the first mounting aperture and the second restraint extending through the second mounting aperture.

20. The insulating blanket assembly of claim 19, wherein:
the first restraint is configured to extend from the first restraint first end and through the first mounting aperture along a direction perpendicular to a central axis of the exhaust aftertreatment component housing, and
the second restraint is configured to extend from the second restraint first end and through the second mounting aperture along the direction.

21. The insulating blanket assembly of claim 19, further comprising:
a third restraint comprising a third restraint first end that is fixed to the outer blanket surface; and
a fourth restraint comprising a fourth restraint first end that is fixed to the outer blanket surface,
wherein the insulating blanket assembly is configured to be removably coupled to the sensor table the via the third restraint and the fourth restraint, the third restraint configured to extend through the first mounting aperture and the fourth restraint configured to extend through the second mounting aperture.

22. The insulating blanket assembly of claim 21, wherein:
the first restraint is configured to extend from the first restraint first end through the first mounting aperture along a direction oriented at an oblique angle relative to a central axis of the exhaust aftertreatment component housing,
the second restraint is configured to extend from the second restraint first end through the second mounting aperture along the direction,
the third restraint is configured to extend from the third restraint first end through the first mounting aperture along the direction, and
the fourth restraint is configured to extend from the fourth restraint first end through the second mounting aperture along the direction.

23. The insulating blanket assembly of claim 13, wherein the first restraint comprises a strap.

24. The insulating blanket assembly of claim 13, wherein the first restraint comprises a spring.

25. The insulating blanket assembly of claim 13, wherein the first restraint comprises a band clamp.

* * * * *